J. M. CONNEL.
Harvester Cutter.
No. 105,550.
Patented July 19, 1870.
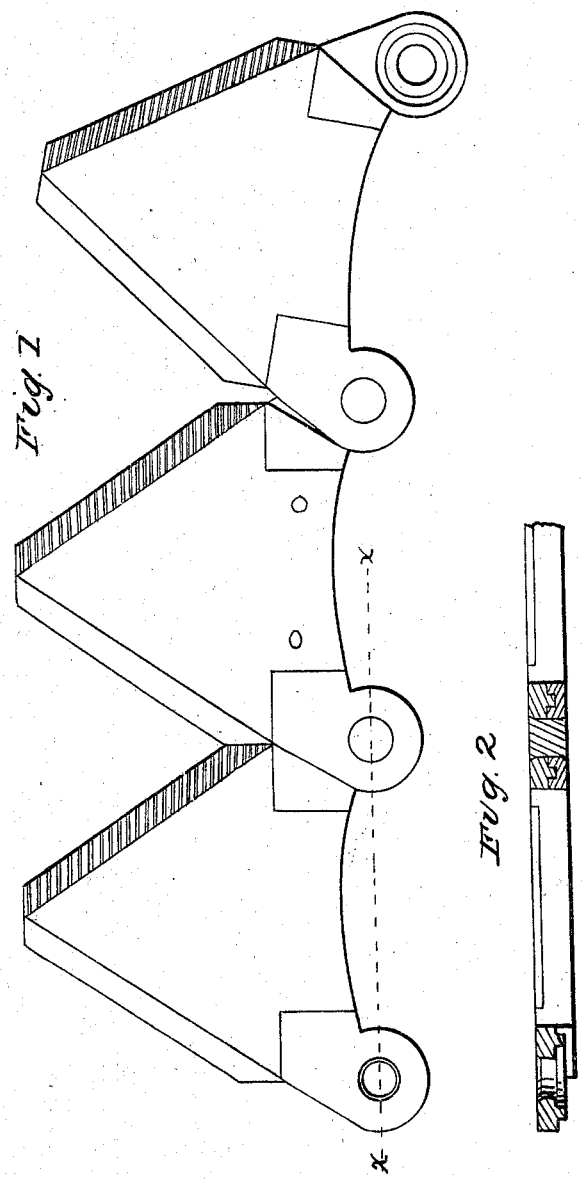
Witnesses
Geo. Smith.
E. R. Brown.
J. M. Connel
Inventor
By J. C. Theaker
his attorney.

UNITED STATES PATENT OFFICE.

JAMES M. CONNEL, OF NEWARK, OHIO.

IMPROVEMENT IN HARVESTER-CUTTER.

Specification forming part of Letters Patent No. 105,550, dated July 19, 1870.

*To all whom it may concern:*

Be it known that I, JAMES M. CONNEL, of Newark, in the county of Licking and State of Ohio, have invented certain new and useful Improvements in Harvester-Cutters; and I do hereby declare that the following is a full, clear, and exact description thereof, sufficient to enable those skilled in the art to which my invention appertains to make and use the same, reference being had to the accompanying drawing, making part of this specification, in which—

Figure 1 is a plan or top view of my improved cutters. Fig. 2 is a horizontal vertical section taken in the line $x$ $x$ of Fig. 1.

The nature of my invention consists in so forming the joints of the endless chain to which the cutters of the harvester are attached that elongation of the chain, caused by the wearing of the joints, will be, as far as practicable, prevented.

The knives are attached to the links or sections of the chain in a similar manner to that described in my patent of September 14, 1869, and are formed with one edge smooth and the other edge serrated. By making them in this form the same knives will serve for both grass and grain.

It will also be found advantageous in its adaptation to the different conditions of grain. If the stalks of the grain are soft and yielding near the roots, the smooth edge will be found sufficient; but if the stalk has become hard and glossy, it will be found preferable to use the sickle or serrated edge.

The endless chain is formed of links or sections, in a similar manner to that described in my patent aforesaid, but the tenons on the curved rear edges are dispensed with, and in lieu thereof the perforated lugs or extensions, by which the links are joined, are turned toward the rear, so as to form cogs or tenons, which engage with the depressions in the pulleys around which the chain passes.

By this means I economize in the quantity of material used, and at the same time increase the strength of the tenons or cogs.

For the purpose of securing greater strength to the joints, I form an annular tongue on one of the lugs of each link corresponding with an annular groove in the lug at the opposite end.

By this means the elongation of the chain by wearing away of the joints is prevented to a great extent, by reason of the larger wearing-surface presented than would be the case if the joints were simply connected by rivets in the ordinary manner, without the annular tongue and groove.

The ends of the links form obtuse angles with its front edge.

On the upper side at one end, and on the lower side at the other end, are triangular depressions, terminating in the perforated lugs or extensions before referred to, so that, when the links are joined together, the obtuse-angled ends of the links fit against corresponding shoulders on the adjoining links, and when the chain bends in passing around the pulleys, instead of presenting triangular spaces between the links, the ends of adjoining links present nearly a straight line between the knives, and serve as guards to ward off straw and other foreign substances, and prevent clogging of the joints.

What I claim as new, and desire to secure by Letters Patent, is—

1. An endless chain with cutters attached, having the joints of the links formed with annular tongues and grooves, substantially as shown and described.

2. An endless chain with cutters attached, so constructed that the joints of the links form cogs, and are provided with annular tongues and grooves, substantially as shown and described.

3. An endless chain with cutters attached, so constructed that the ends of the links form obtuse angles with their front edges, and are formed with triangular depressions corresponding with said obtuse-angled ends, and the joints are formed with annular tongues and grooves, substantially as shown and described.

J. M. CONNEL.

Witnesses:
J. M. BARDWELL,
W. S. FOSTER.